(12) United States Patent
Hobson et al.

(10) Patent No.: US 12,446,837 B2
(45) Date of Patent: Oct. 21, 2025

(54) BIOMETRIC-BASED DISTRESS DETECTION AND DELIVERY OF ASSISTANCE

(71) Applicant: International Business Machines Corporation, Armonk, NY (US)

(72) Inventors: Stacy F. Hobson, Poughkeepsie, NY (US); Cedric D. Cook, Richmond, TX (US); Osakpamwan Osaigbovo, Argyle, TX (US); Myneeka Holloway, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 17/182,944

(22) Filed: Feb. 23, 2021

(65) Prior Publication Data

US 2022/0265222 A1 Aug. 25, 2022

(51) Int. Cl.
*A61B 5/00* (2006.01)
*G06V 20/40* (2022.01)
*G06V 40/10* (2022.01)

(52) U.S. Cl.
CPC ............ *A61B 5/746* (2013.01); *A61B 5/0006* (2013.01); *A61B 5/0008* (2013.01); *A61B 5/002* (2013.01);
(Continued)

(58) Field of Classification Search
CPC ..... A61B 5/746; A61B 5/0006; A61B 5/0008; A61B 5/002; A61B 2562/0204; A61B 2562/0271; A61B 5/0077; A61B 5/02055; A61B 5/021; A61B 5/024; A61B 5/1113; A61B 5/1128; A61B 5/14517;
(Continued)

(56) References Cited

U.S. PATENT DOCUMENTS 8,747,336 B2 * 6/2014 Tran ..................... A61B 5/0077
600/595
9,706,379 B2 7/2017 Gaurav et al.
(Continued)

FOREIGN PATENT DOCUMENTS

JP 2010249628 A 11/2010
WO 2018/201188 A1 11/2018

OTHER PUBLICATIONS

Rana et al.; "Automated Screening For Distress: A Perspective For The Future", Cornell University Library, arXiv:1902.09944v2, pp. 1-10, Jul. 28, 2020, 10 pages.
(Continued)

*Primary Examiner* — Scott M. Getzow
(74) *Attorney, Agent, or Firm* — Harrity & Harrity, LLP

(57) ABSTRACT

A computer system provides biometric-based distress detection and assistance. Biometric information that is associated with an entity and audio data associated with an environment of the entity are received. A distress score is calculated based on the biometric information. The audio data is analyzed to identify one or more distress factors. In response to determining that the distress score exceeds a distress threshold and in response to identifying the one or more distress factors, a notification that the entity requires aid is transmitted to a third party. Embodiments of the present invention further include a method and program product for providing biometric-based distress detection and assistance in substantially the same manner described above.

11 Claims, 5 Drawing Sheets

(52) U.S. Cl.
CPC .............. *G06V 20/49* (2022.01); *G06V 40/10* (2022.01); *G06V 40/15* (2022.01)

(58) Field of Classification Search
CPC ..... A61B 5/4803; A61B 5/7275; A61B 5/165; G06V 20/49; G06V 40/10; G06V 40/15; G06V 20/41
USPC ........................................................ 600/301
See application file for complete search history.

(56) References Cited

U.S. PATENT DOCUMENTS

| | | | |
|---|---|---|---|
| 9,781,247 | B1 | 10/2017 | Gadepalli et al. |
| 9,801,553 | B2 | 10/2017 | Chadderdon, III et al. |
| 10,015,839 | B1 | 7/2018 | Depew |
| 10,154,655 | B2 | 12/2018 | Schab et al. |
| 10,322,728 | B1 | 6/2019 | Porikli et al. |
| 10,664,904 | B2 | 5/2020 | Wright et al. |
| 11,250,876 | B1* | 2/2022 | McCloskey ............ G06N 20/10 |
| 11,776,047 | B1* | 10/2023 | Jain .................... G06Q 30/0625 705/27.2 |
| 2008/0219509 | A1 | 9/2008 | White et al. |
| 2013/0040596 | A1 | 2/2013 | Paim et al. |
| 2016/0135695 | A1* | 5/2016 | Cobbett ............... A61B 5/4866 600/301 |
| 2016/0135706 | A1* | 5/2016 | Sullivan ................ A61B 5/316 600/509 |
| 2016/0330601 | A1 | 11/2016 | Srivastava |
| 2017/0230786 | A1 | 8/2017 | Ramamurthy et al. |
| 2018/0075720 | A1 | 3/2018 | Davies et al. |
| 2019/0297399 | A1 | 9/2019 | Sieja et al. |
| 2020/0037964 | A1 | 2/2020 | Gujral et al. |
| 2022/0031161 | A1* | 2/2022 | Marathe ............... A61B 5/0008 |

OTHER PUBLICATIONS

Kaklauskas et al.; "Biometric Advisory System To Analyze A User's Post-Disaster Stress Management", Procedia Economics And Finance, vol. 18, pp. 908-915, Sep. 8-10, 2014, 8 pages.

Carneiro et al.; "New Methods for Stress Assessment And Monitoring At The Workplace", Taffc IEEE Transactions On, vol. 10, Issue 2, pp. 1-19, Apr. 28, 2017, 19 pages.

Freeston et al.; "Towards A Model Of Uncertainty Distress In The Context Of Coronavirus (COVID-19)", The Cognitive Behaviour Therapist, vol. 13, e31, pp. 1-15, Jun. 27, 2020, 15 pages.

Kiguchi et al.; "Mental Condition Monitoring Based On Multimodality Biometry", Frontiers In Public Health, vol. 8, Article 479431, pp. 1-7, Oct. 22, 2020, 7 pages.

Webpage, "Autonomous drones for better imaging coverage of incidents #26", https://github.com/Call-for-Code/Embrace-Judicial-Reform/issues/26, downloaded from the internet on Feb. 17, 2021, 1 page.

Webpage, "Idea: A mobile and analytics platform available to social justice groups and the general public which enables people to capture evidence of social injustice using a mobile app #4", https://github.com/Call-for-Code/Embrace-Judicial-Reform/issues/4, downloaded from the internet on Feb. 17, 2021, 8 pages.

* cited by examiner

BIOMETRIC-BASED DISTRESS DETECTION AND DELIVERY OF ASSISTANCE

BACKGROUND

1. Technical Field

Present invention embodiments relate to automatic dispatching of aid in emergency situations, and more specifically, to monitoring and analyzing biometric data to detect distress in a user and to automatically deliver assistance.

2. Discussion of the Related Art

In the field of medicine, biometrics are body measurements and calculations that relate to characteristics of an organism. Biometric data can be collected by observing any biosignal, which includes any electrical or non-electrical signal of an organism that can be measured or monitored. For example, biometric data can include a dimension or volume of an organism, a heart rate, a fingerprint, a blood oxygen level, electrical activity in a brain, and any other qualitative or quantitative aspect of an organism. By collecting and analyzing biometric data, a particular biometric state can be revealed, such as an emotional state of an individual or the presence of a medical condition.

SUMMARY

According to one embodiment of the present invention, a computer system provides biometric-based distress detection and assistance. Biometric information that is associated with an entity and audio data associated with an environment of the entity are received. A distress score is calculated based on the biometric information. The audio data is analyzed to identify one or more distress factors. In response to determining that the distress score exceeds a distress threshold and in response to identifying the one or more distress factors, a notification that the entity requires aid is transmitted to a third party. Embodiments of the present invention further include a method and program product for providing biometric-based distress detection and assistance in substantially the same manner described above.

BRIEF DESCRIPTION OF THE DRAWINGS

Generally, like reference numerals in the various figures are utilized to designate like components.

DETAILED DESCRIPTION

Figure 1:
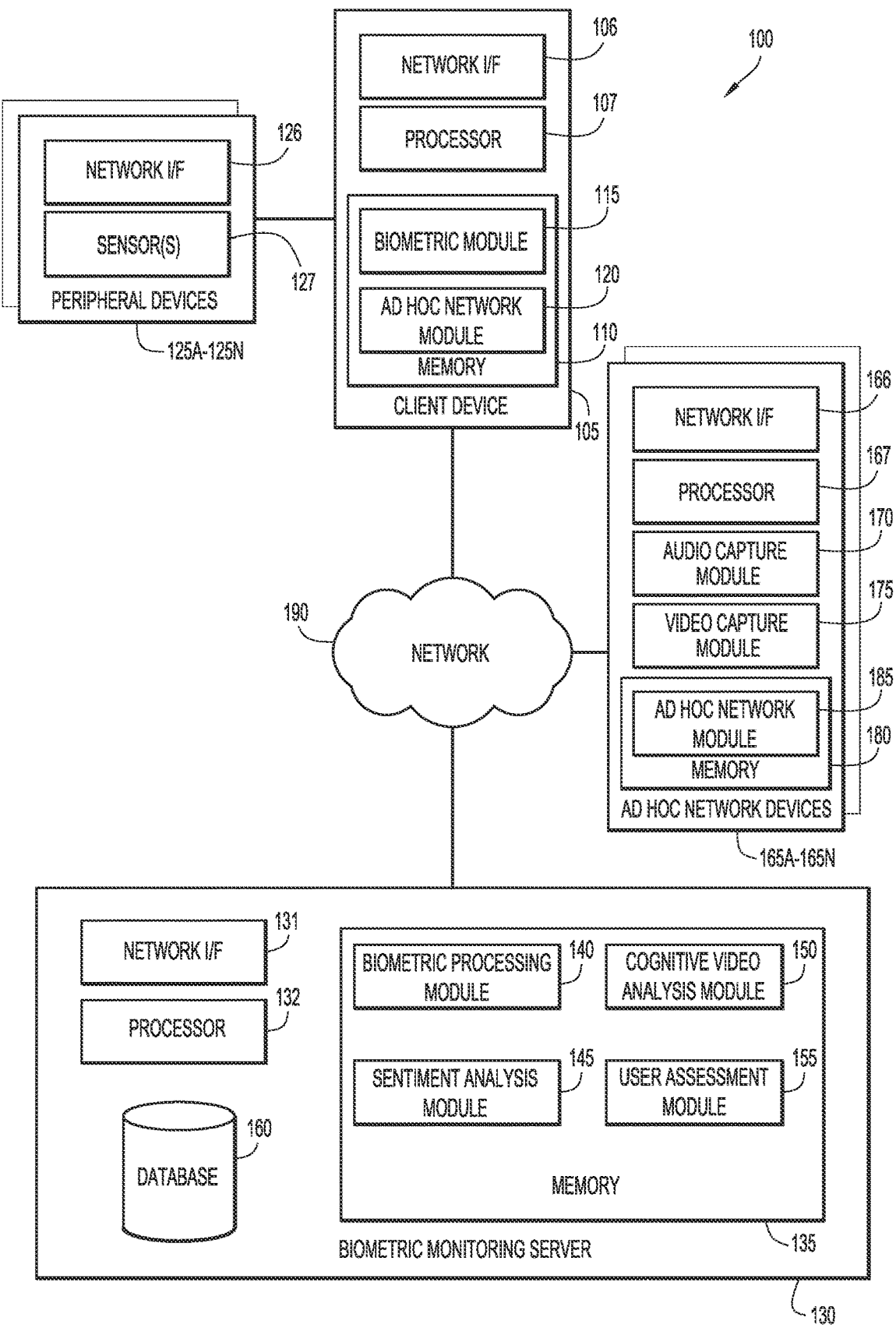
FIG. 1 is a block diagram depicting a computing environment for processing biometric data in accordance with an embodiment of the present invention.

Present invention embodiments relate to monitoring and analyzing biometric data, and more specifically, to analyzing biometric data to detect distress in a user and to deliver assistance. Various mental and/or physical states of an individual can be determined in real-time by collecting and analyzing the individual's biometric data. For example, heightened heart rate and perspiration can be associated with distress, panic, or fear. However, distinguishing mental states, such as a state of distress, from other physical activities (e.g., exercising) can be difficult via conventional approaches to biometric analysis.

In contrast, embodiments presented herein analyze biometric data in a manner that can detect when a user is experiencing distress, and if so, can automatically deliver assistance to the user. In particular, the context of the user's biometric data is analyzed to identify that the user is experiencing distress, and appropriate actions are selected and performed to capture the user's environment in detail and to deploy aid to the user. As used herein, distress can refer to any negative emotional state or combination of emotional states, including anxiety, sorrow, pain, fear, anguish, dread, nervousness, discomfort, pain, neediness, disgust, anger, loneliness, melancholy, annoyance, and the like. The context of the user's biometric data can be determined by analyzing audio data and/or video data that is captured in the vicinity of the user to identify details such as the sentiment of the user and others, activities being performed by the user and others, and the like, which are helpful in verifying that the user's biometric data is indeed indicative of distress. When a user is determined to be experiencing distress, the event(s) causing the distress can be automatically de-escalated by performing actions such as alerting emergency responders to the user's distress. Moreover, by collecting additional audio and/or video data in the vicinity of the user, machine learning models, used to analyze the context of biometric data, can be updated and improved.

Biometric data can be processed using techniques presented herein to enable new insights, such as detection of a user's distress, to be determined more accurately and more rapidly as compared to conventional biometric analysis techniques. Thus, present invention embodiments improve the field of biometric data processing by utilizing a particular approach that assesses a user's biometric data in real-time and based on the context in which the data is acquired. Present invention embodiments provide the practical application of more quickly and more accurately determining that a user is experiencing a negative emotional state (e.g., distress), which corresponds to a more rapid response to distressing or dangerous events. A shortened response time is not only beneficial to the user, but can reduce or eliminate damage to persons and/or property. Moreover, by selectively capturing audio and/or video data in the vicinity of the user when the user appears to be in distress, present invention embodiments improve computing devices and networks by reducing the consumption of computing and networking resources (e.g., processing resources, memory resources, storage resources, bandwidth resources, etc.) as compared to the "always-on" approaches employed by conventional security or other monitoring systems. Furthermore, present invention embodiments provide a technical solution that extends evidence-gathering capabilities of monitoring systems while respecting individuals' privacy.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Present invention embodiments will now be described in detail with reference to the Figures. FIG. 1 is a block diagram depicting a computing environment 100 for processing biometric data in accordance with an embodiment of the present invention. As depicted, computing environment 100 includes a client device 105, one or more peripheral devices 125A-125N, a biometric monitoring server 130, one or more ad hoc network devices 165A-165N, and a network 190. It is to be understood that the functional division among components of computing environment 100 have been chosen for purposes of explaining present invention embodiments and is not to be construed as a limiting example.

Client device 105 includes a network interface (I/F) 106, at least one processor 107, and memory 110 that includes a biometric module 115 and an ad hoc network module 120. Client device 105 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 106 enables components of client device 105 to send and receive data over a network, such as network 190 and/or one or more ad hoc networks. In general, client device 105 collects biometric data corresponding to a user of client device 105 and enables the user to be monitored and assessed for any potential negative emotional states such as distress. Client device 105 may include internal and external hardware components, as depicted and described in further detail with respect to FIG. 5.

Biometric module 115 and ad hoc network module 120 may include one or more modules or units to perform various functions of present invention embodiments described below. Biometric module 115 and ad hoc network module 120 may be implemented by any combination of any quantity of software and/or hardware modules or units, and may reside within memory 110 of client device 105 for execution by a processor, such as processor 107.

Biometric module 115 may gather biometric data relating to a user of client device 105. Biometric data can include data collected via any biosignal, and can measure qualitative and/or quantitative aspects of the user. For example, the biometric data may include a user's blood pressure, heart rate, temperature, perspiration level, voice volume, body position, blood oxygen level, respiratory rate, hormone levels, blood sugar levels, movement (e.g., number of steps taken, pace, change in elevation, etc.), any activities performed by the user, and any other observable data. Biometric module 115 may collect biometric data via sensors that are associated with client device 105 and/or via other devices, such as peripheral devices 125A-125N.

In some embodiments, biometric module 115 continuously gathers biometric data and transmits the data to (or otherwise makes the data available to) other network-accessible devices or systems, such as biometric monitoring server 130. Biometric module 115 may directly provide biometric monitoring server 130 with collected biometric data, or biometric module 115 may pre-process at least a portion of the collected biometric data before passing the biometric data to biometric monitoring server 130.

In some embodiments, biometric module 115 polls one or more sources of biometric data, such as any of peripheral devices 125A-125N, according to a particular schedule. For example, heart rate data may be obtained ever thirty seconds or every two minutes. Additionally or alternatively, some or all of the biometric data may be collected continuously. In some embodiments, biometric module 115 collects biometric data when certain conditions are met, such as during a particular time of day, when the user is at a particular location or away from a particular location, or in response to client device 105 experiencing user activity. Thus, for example, biometric module 115 may collect data whenever the user is away from the user's residence, during a particular time of the day (e.g., 9 AM to 9 PM), and/or for a span of time (e.g., one hour) after client device 105 has been accessed by the user.

Ad hoc network module 120 enables client device 105 to discover computing devices in the vicinity of the user in order to obtain video data and/or audio data to provide a context of events that cause users to experience distress and to capture other details of the event that are used for evidentiary purposes (e.g., event auditing) and for improving machine learning models utilized by present invention embodiments.

When a user's biometric data indicates that the user is experiencing distress, ad hoc network module 120 may wirelessly broadcast instructions to any computing devices in the vicinity that, when received by compatible devices, cause those devices to obtain audio data and/or video data and to transmit that data to a destination, such as client device 105 and/or biometric monitoring server 130. Ad hoc network module 120 may utilize conventional or other wireless communication connections and/or protocols, such as Wi-Fi®, Bluetooth®, and the like. Thus, ad hoc network module 120 enables client device 105 to communicate with any compatible computing devices (e.g., ad hoc network devices 165A-165N) that, being within range of wireless communication, are likely to be situated in locations that are suitable for gathering audio data and/or video data that relates to the user and/or any circumstances potentially relating to the user's state of distress.

Peripheral devices 125A-125N each include a network interface (I/F) 126 and one or more sensors 127. Each sensor 127 can observe one or more biosignals in order to collect biometric data relating to the user. Peripheral devices 125A-125N may be situated on the user's person, incorporated into or onto the user's body, or otherwise worn by the user, and can include devices such as a smartwatch, a heart rate monitor, a glucose monitor, an electronic tattoo, implanted devices, and the like. Sensors 127 of peripheral devices 125A-125N can collect biometric data that includes, for example, blood pressure data, heart rate data, temperature data, perspiration data, skin conductance data, voice volume data, body position data, blood oxygenation data, respiratory rate data, hormone level data, blood sugar level data, movement data (e.g., number of steps taken, pace, change in elevation), user activity data, and any other observable data. Biometric data collected by peripheral devices 125A-125N can be obtained by biometric module 115 of client device 105 and/or transmitted to biometric monitoring server 130.

Biometric monitoring server 130 includes a network interface (I/F) 131, at least one processor 132, and memory 135. Memory 135 may include a biometric processing module 140, a sentiment analysis module 145, a cognitive video analysis module 150, and a user assessment module 155. Biometric monitoring server 130 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 131 enables components of biometric monitoring server 130 to send and receive data over a network, such as network 190. In general, biometric monitoring server 130 and its modules analyze biometric data of users to determine when users are in distress and to automatically perform actions to de-escalate situations causing distress. Biometric monitoring server 130 may include internal and external hardware components, as depicted and described in further detail with respect to FIG. 5.

Biometric processing module 140, sentiment analysis module 145, cognitive video analysis module 150, and user assessment module 155 may include one or more modules or units to perform various functions of present invention embodiments described below. Biometric processing module 140, sentiment analysis module 145, cognitive video analysis module 150, and user assessment module 155 may be implemented by any combination of any quantity of software and/or hardware modules or units, and may reside within memory 135 of biometric monitoring server 130 for execution by a processor, such as processor 132.

Biometric processing module 140 obtains biometric data of users and analyzes the data to determine whether the biometric data is indicative of a user experiencing distress. Biometric processing module 140 may determine a baseline value for each type of biometric that is obtained from a user. By comparing a user's subsequently-collected biometric data to the user's baseline values, biometric processing module 140 detects deviations from the baseline values that can indicate that the user is in distress. For example, biometric processing module 140 may compare a current heart rate of a user to the user's baseline heart rate to determine that the user's current heart rate is elevated, which can be an indicator of distress. Biometric processing module 140 may determine a user's baseline values by observing the user's biometric data over time and/or during periods in which the user is known to not be experiencing distress. The determination of baseline values is depicted and described in further detail with respect to FIG. 3.

In some embodiments, biometric processing module 140 computes a distress metric for each type of biometric that is collected, and determines an overall distress score based on the values of the distress metrics. For example, the distress metrics can include one or more of a blood pressure metric, a heart rate metric, a temperature metric, a perspiration metric, and a voice volume metric. The values of each distress metric can be determined based on the deviation of collected biometric data from a user's baseline. The extent to which a biometric value deviates from a user's baseline can be normalized to a particular range of values, enabling different types of biometrics to be compared or combined. For example, values for each distress metric can range between minimum and maximum values (e.g., zero and one), with smaller values (i.e., closer to zero) being associated with smaller deviations from the baseline. Biometric processing module 140 can obtain biometric data from client device 105 as the biometric data is made available, enabling distress metrics and distress scores to be computed in real-time.

In some embodiments, distress metrics can be computed using a rules-based approach in which the magnitude of a biometric value's deviation from a user's baseline is associated with a particular distress metric value. Each distress metric may be provided with its own set of predetermined rules for determining the value of the distress metric. Table 1 indicates values for a blood pressure metric in accordance with embodiments of the present invention:

TABLE 1

| Measured blood pressure (BP) versus baseline blood pressure: | Blood pressure metric: |
|---|---|
| BP = baseline | 0 |
| BP ≤ 10% over baseline | 0.6 |
| 10% < BP ≤ 15% over baseline | 0.7 |
| 15% < BP ≤ 20% over baseline | 0.8 |
| BP > 20% over baseline | 0.95 |

Thus, for example, a blood pressure that is 14% over a user's baseline would be assigned a value of 0.6 for the user's blood pressure metric.

Table 2 indicates values for a heart rate metric in accordance with embodiments of the present invention:

TABLE 2

| Measured heart rate (HR) versus baseline heart rate: | Heart rate metric: |
|---|---|
| HR = baseline | 0 |
| HR < 10% over baseline | 0.6 |
| 10% < HR ≤ 20% over baseline | 0.7 |
| 20% < HR ≤ 30% over baseline | 0.8 |
| HR > 30% over baseline | 0.95 |

Thus, for example, a heart rate that is 33% over a user's baseline would be assigned a value of 0.95 for the user's heart rate metric.

Table 3 indicates values for a temperature metric in accordance with embodiments of the present invention:

TABLE 3

| Measured temperature (T) versus baseline temperature: | Temperature metric: |
|---|---|
| T = baseline | 0 |
| T < 3% over baseline | 0.6 |
| 3% < T ≤ 5% over baseline | 0.7 |
| T > 5% over baseline | 0.9 |

For example, if a user's temperature is 4% over the user's baseline temperature, then a value of 0.7 would be assigned for the user's temperature metric.

Table 4 indicates values for a perspiration metric in accordance with embodiments of the present invention:

TABLE 4

| Measured perspiration level (P) versus baseline | Perspiration metric |
|---|---|
| P = baseline | 0 |
| P < 10% over baseline | 0.6 |

TABLE 4-continued

| Measured perspiration level (P) versus baseline | Perspiration metric |
|---|---|
| 10% < P ≤ 20% over baseline | 0.7 |
| 20% < P ≤ 30% over baseline | 0.85 |
| P > 30% over baseline | 0.95 |

For example, a perspiration level of 15% over a user's baseline corresponds to a perspiration metric value of 0.7.

Table 5 indicates values for a voice volume metric in accordance with embodiments of the present invention:

TABLE 5

| Measured voice volume (V) versus baseline | Voice volume metric |
|---|---|
| V = baseline | 0 |
| 100% < V ≤ 200% over baseline | 0.75 |
| V > 200% over baseline | 1.0 |

Voice volumes can be compared using decibel values, and the different values for the voice volume metric can be assigned based on volume levels that correspond to resting voices, elevated voices, and yelling or shouting voices. For example, a shout that is greater than 200% louder than normal speech can be assigned a value of 1.0 according to Table 5.

Biometric processing module 140 may compute an overall distress score based on the values for each distress metric that is computed for a user. The distress score can be computed using any mathematical operation that accomplishes a combination of the component distress metric values. For example, the distress score may be determined by averaging distress metric values, summing distress values, and the like. In some embodiments, the values for the distress metrics are used to construct an n-dimensional vector and the magnitude of the vector is used as the distress score. Thus, the distress score can be equal to a square root of the sum of the squares of each distress metric value. The values of the distress metrics that are used to calculate the distress score may be determined based on biometric data that is collected at a same time or within a same span of time (e.g., within a five minute interval). Biometric processing module 140 may compute distress metrics and/or distress scores according to a particular schedule or at a particular rate, such as every five minutes. The distress scores may be further utilized by user assessment module 155 (as described below) in order to determine distress in accordance with present invention embodiments.

Sentiment analysis module 145 may analyze audio data that is captured in the vicinity of the user in order to identify distress factors, including sentiments and other contextual details, that can indicate that the user is in distress. Sentiment analysis module 145 may employ one or more conventional or other machine learning models that are trained to identify distress factors based on the content and manner of speech. The machine learning model utilized by sentiment analysis module 145 can include a decision tree model, a deep learning model (e.g., long short-term memory recurrent neural networks), a random forest model, a support vector machine model, or other supervised and/or unsupervised models. The machine learning model can be trained to detect tones by using a training set of examples of text labeled with one or more tones. In some embodiments, the machine learning model of sentiment analysis module 145 is trained using labeled vectors that are generated based on examples of text (e.g., using one-hot encoding).

For example, sentiment analysis module 145 may detect tones including emotions like anger, disgust, fear, joy, sadness, confidence, tentativeness, and the like. In some embodiments, sentiment analysis module 145 employs a sentiment analysis model that can analyze speech (or text generated after converting speech to text) of the user and/or other individuals in the user's vicinity in order to detect key emotions like anger and fear which would indicate stronger likelihood of an escalating situation. Similarly, when a user's distress score is indicative of distress, sentiment analysis module 145 can distinguish that the user is not actually experiencing distress based on the presence of other emotions such as joy, excitement, etc. Additionally, sentiment analysis module 145 may identify other distress factors in the user's environment, such as shouting, cries of pain, sirens, horns, alarms, use of potentially dangerous instruments, and the like.

The audio data processed by sentiment analysis module 145 may be obtained from a device of the user, such as client device 105 or peripheral devices 125A-125N, or from other devices, such as ad hoc network devices 165A-165N. Identified distress factors can be provided to user assessment module 155 for further processing.

Cognitive video analysis module 150 may analyze video data that is captured in the vicinity of the user in order to identify distress factors based on the context of the user. Cognitive video analysis module 150 may utilize one or more conventional or other machine learning models that are trained to analyze video or images to perform object detection, location classification, and/or expression analysis. In some embodiments, an image segmentation is performed to extract portions of an image that contain an object or individual, and trained machine learning model can be applied to perform image classification, object recognition and/or expression analysis. Cognitive video analysis module 150 may include a machine learning model such as a deep learning model, a support vector model, a convolutional neural network model, and the like. The machine learning model(s) of cognitive video analysis module 150 can be trained using a training set of data that includes labeled examples of objects (e.g., labeled with respect to the identity of the object), expressions, (e.g. labeled with respect to a mood of the individual), settings/environments (e.g., labeled with respect to the classification or the interior and/or exterior environment), and the like.

Distress factors that are identified by cognitive video analysis module 150 can include a crowd of people near a user, one or more individuals coming within a threshold distance of the user (e.g., invading personal space), changes in direction, distance, or physical movement of individuals as compared to previous imagery, recognition of particular objects such as potentially dangerous implements, animals, or other potential threats, recognition of expressions indicative of distress, such as fear or surprise, and the like.

Cognitive video analysis module 150 may identify distress factors based on activities, such as running, positions of the user's body (e.g., lying down in a prone or supine position, kneeling), physical activities such as fighting, raising of hands (e.g., a surrender stance), pushing, grabbing, restraining, brandishing of objects, and the like. In some embodiments, cognitive video analysis module 150 classifies a location of the user to provide context for the user's biometric data. For example, if the user is at a location such as a gym, swimming pool, or climbing wall, the user may be determined to not be in distress despite having a heightened heart rate or perspiration level.

The video data processed by cognitive video analysis module 150 may be obtained from a device of the user, such as client device 105 or peripheral devices 125A-125N, or from other devices, such as ad hoc network devices 165A-165N. Identified distress factors can be provided to user assessment module 155 for further processing.

User assessment module 155 may analyze distress scores in combination with any distress factors identified by the sentiment analysis model(s) and/or cognitive video analysis model(s) in order to determine whether a user is in distress. In some embodiments, user assessment module 155 compares distress scores of a user to a predetermined threshold to determine that the user is in distress. For example, if the distress threshold is 0.85, then a distress score of 0.9 may indicate that the user is in distress.

In some embodiments, sentiment analysis module 145 and/or cognitive video analysis module 150 do not process audio and/or video data relating to a user until instructed by user assessment module 155. User assessment module 155 may instruct sentiment analysis module 145 and/or cognitive video analysis module 150 to begin analyzing a user's context for distress factors in response to the user's distress score exceeding a threshold, which may be the threshold used to identify distress or a different, separate threshold. For example, if a user's distress score exceeds 0.6, then sentiment analysis module 145 may request the identification of any distress factors using available audio data and/or video data.

In some embodiments, user assessment module 155 identifies that a user is in distress based on the user's distress score exceeding a threshold. In some embodiments, user assessment module 155 identifies that a user is in distress based on the user's distress score exceeding a threshold and additionally based on the presence of one or more distress factors. Distress factors may be quantified based on a predetermined set of rules that correlate particular distress factors with particular values. For example, one or more individuals shouting at the user may correspond to one numerical value, and one or more individuals coming into physical contact with the user may correspond to another numerical value. Thus, in some embodiments, a user's distress score can be further combined with values derived from the distress factors present at the time, and a holistic score that includes both the distress score and distress factors can be computed and compared to a threshold to determine whether or not the user is in distress. In some embodiments, factors that indicate a lack of distress may be assigned negative values and included in the calculations. For example, a user's distress score may be adjusted by decreasing the distress score by a predetermined amount when the user is determined to be exercising. In some embodiments, user assessment module 155 may determine that a user is not in distress, despite the distress score exceeding its threshold, based on the presence of one or more factors associated with a lack of distress.

When user assessment module 155 determines that a user is in distress, user assessment module 155 may notify one or more third parties so that assistance can be provided to the user. User assessment module 155 may notify one or more parties, such as police, fire, emergency medical services, and/or other first responders. In some embodiments, the type of party is selected based on the distress score and/or identified distress factors. In particular, a rules-based approach may be employed for selecting particular types of parties based on a category of distress factor that is present. For example, if a distress factor indicates injury, medical services may be notified, and/or if a distress factor indicates criminal behavior, a law enforcement party may be notified. User assessment module 155 may access a database, such as database 160, that includes contact information for electronically contacting each third party on the basis of the location serviced by the party and the location of the user. User assessment module 155 may also send a notification to client device 105 in the event that user distress is detected.

Database 160 may include any non-volatile storage media known in the art. For example, database 160 can be implemented with a tape library, optical library, one or more independent hard disk drives, or multiple hard disk drives in a redundant array of independent disks (RAID). Similarly, data in database 160 may conform to any suitable storage architecture known in the art, such as a file, a relational database, an object-oriented database, and/or one or more tables. In some embodiments, database 160 may store data relating to user biometrics, including baseline values of users, current or historical biometric data collected from users, third party information, including locations serviced by each third party, and audio and video data collected by client device 105 and/or ad hoc network devices 165A-165N.

Ad hoc network devices 165A-165N may each include a network interface (I/F) 166, at least one processor 167, an audio capture module 170, a video capture module 175, and memory 180 that includes an ad hoc network module 185. Ad hoc network devices 165A-165N may each include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 166 enables components of ad hoc network devices 165A-165N to send and receive data over a network, such as network 190 and/or an ad hoc network. In general, ad hoc network devices 165A-165N collect audio data and/or video data relating to users in distress. Ad hoc network devices 165A-165N may include internal and external hardware components, as depicted and described in further detail with respect to FIG. 5.

Ad hoc network devices 165A-165N may form an ad hoc network in response to a user experiencing distress. When user assessment module 155 of biometric monitoring server 130 notifies client device 105 that the user is determined to be in distress, client device 105 may broadcast a request that can be received by ad hoc network devices 165A-165N. Ad hoc network devices 165A-165N may each include an audio capture module 170 for the collection of audio data and a video capture module 175 for the collection of video data.

Ad hoc network module 185 may include one or more modules or units to perform various functions of present invention embodiments described below. Ad hoc network module 185 may be implemented by any combination of any quantity of software and/or hardware modules or units, and may reside within memory 180 of ad hoc network devices 165A-165N for execution by a processor, such as processor 167.

When ad hoc network device 165A-165N receives a request from client device 105, ad hoc network module 185 processes the request to form an ad hoc network with other devices and to begin collecting audio data and/or video data. Ad hoc network devices 165A-165N may transmit collected data to client device 105 and/or to biometric monitoring server 130. In some embodiments, ad hoc network devices 165A-165N may form a mesh network, enabling some devices to transmit data to network 190 via other members of the mesh network. Any video data and audio data collected by ad hoc network devices 165A-165N may be transmitted to biometric monitoring server 130 so that the data may be processed by sentiment analysis module 145, processed by cognitive video analysis module 150, and/or stored in database 160. In some embodiments, the video data and/or audio data collected by ad hoc network devices 165A-165N may be shared with the one or more third parties that were selected to be notified of the user's distress. The data collected by ad hoc network devices 165A-165N may be utilized for evidentiary purposes, as the data may include details of the event that caused the user's distress. For example, if the user is a victim of a crime, the data may include video of the perpetrator's appearance. In some embodiments, the data collected by ad hoc network devices may be reviewed and labeled to create training data for machine learning algorithms, such as a sentiment analysis model or a cognitive video analysis model. Thus, incidents can be reviewed to improve the ability of machine learning models to identify distress factors in other video or audio data.

Network 190 may include a local area network (LAN), a wide area network (WAN) such as the Internet, or a combination of the two, and includes wired, wireless, or fiber optic connections. In general, network 190 can be any combination of connections and protocols known in the art that will support communications between client device 105, peripheral devices 125A-125N, biometric monitoring server 130, and/or ad hoc network devices 165A-165N via their respective network interfaces in accordance with embodiments of the present invention.

Figure 2:
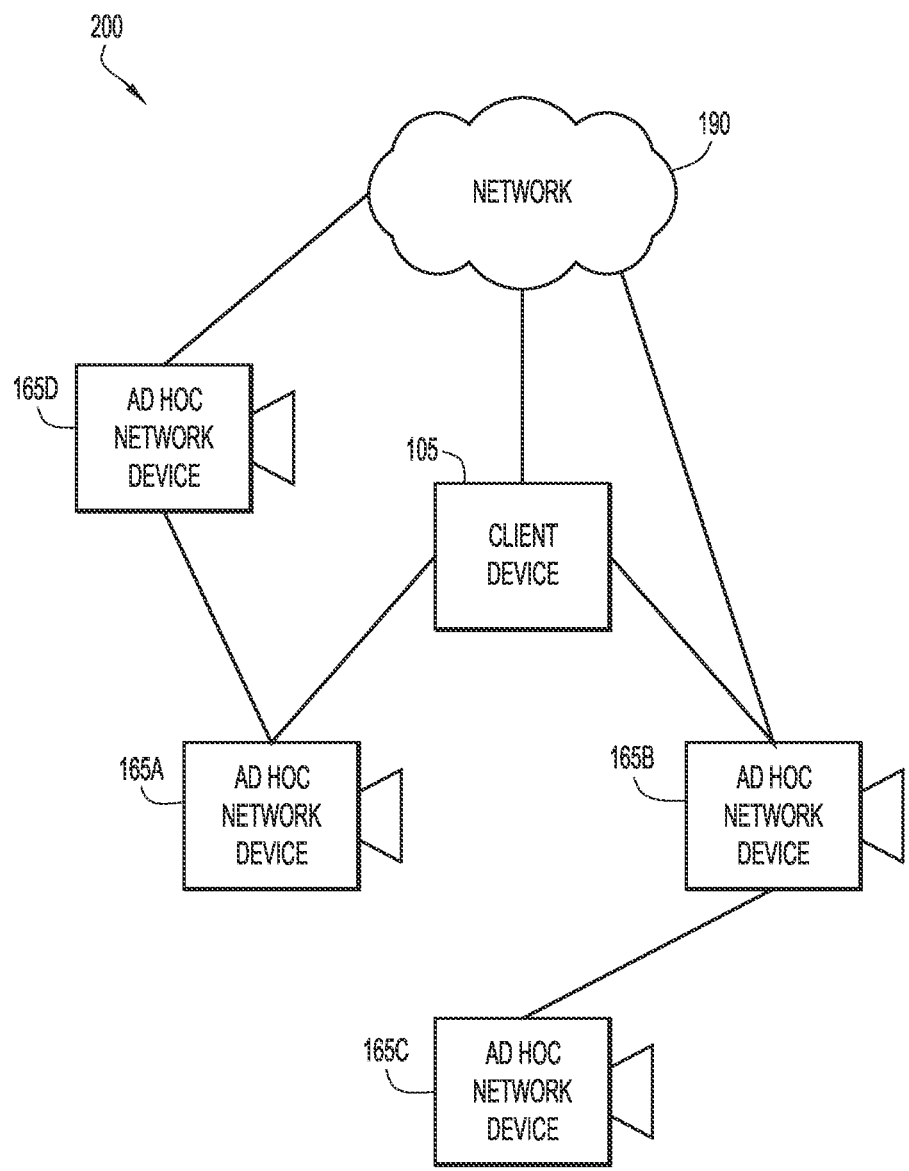
FIG. 2 is a block diagram depicting a computing network for monitoring a user to collect data in accordance with an embodiment of the present invention.

FIG. 2 is a block diagram depicting a computing network 200 for monitoring a user to collect data in accordance with an embodiment of the present invention. As depicted, computing network 200 is an ad hoc computing network populated by client device 105 and ad hoc network devices 165A-165D. Client device 105 is depicted and described in further detail with reference to FIG. 1, and ad hoc network devices 165A-165D may include a subset of ad hoc network devices 165A-165N, which are also depicted and described in further detail with reference to FIG. 1.

When client device 105 receives a notification that the user is experiencing distress, client device 105 may wirelessly broadcast instructions to any compatible devices within range to begin collecting audio data and video data and to transmit the collected data to one or more locations (e.g., biometric monitoring server 130). As depicted, client device 105 has formed a direct wireless connection with ad hoc network device 165A and ad hoc network device 165B. In some embodiments, the ad hoc network devices that join the ad hoc network may also broadcast instructions similar to the set of instructions broadcast by client device 105 to perform additional discovery of devices that, while not in range of client device 105, are within range of the other ad hoc network devices. Thus, in the depicted example, ad hoc network device 165C can join computing network 200 via ad hoc network device 165B, despite ad hoc network device 165C not being within range of client device 105, and similarly, ad hoc network device 165D can join computing network 200 via ad hoc network device 165A. In some embodiments, the instructions to form the ad hoc computing network may include instructions for devices to expand the network a particular number of hops away from the client device 105. For example, the instructions can indicate that any devices receiving the instructions from client device 105 should additionally broadcast another set of instructions, and any devices that receive the second iteration of instructions should broadcast a third iteration of instructions. Thus, computing network 200 can potentially collect video and/or audio data corresponding to any desired volume of physical space around the user of client device 105.

Ad hoc network devices 165A-165D may transmit collected data to one or more network locations that are accessible via network 190. Some members of computing network 200, such as ad hoc network devices 165C, may not have direct access to network 190, and may instead transmit data by way of another device, such as ad hoc network device 165B. Members of computing network 200 may additionally or alternatively transmit data to client device 105, which can store the data and/or transmit the data to network locations (e.g., biometric monitoring server 130) via its own connection to network 190.

Figure 3:
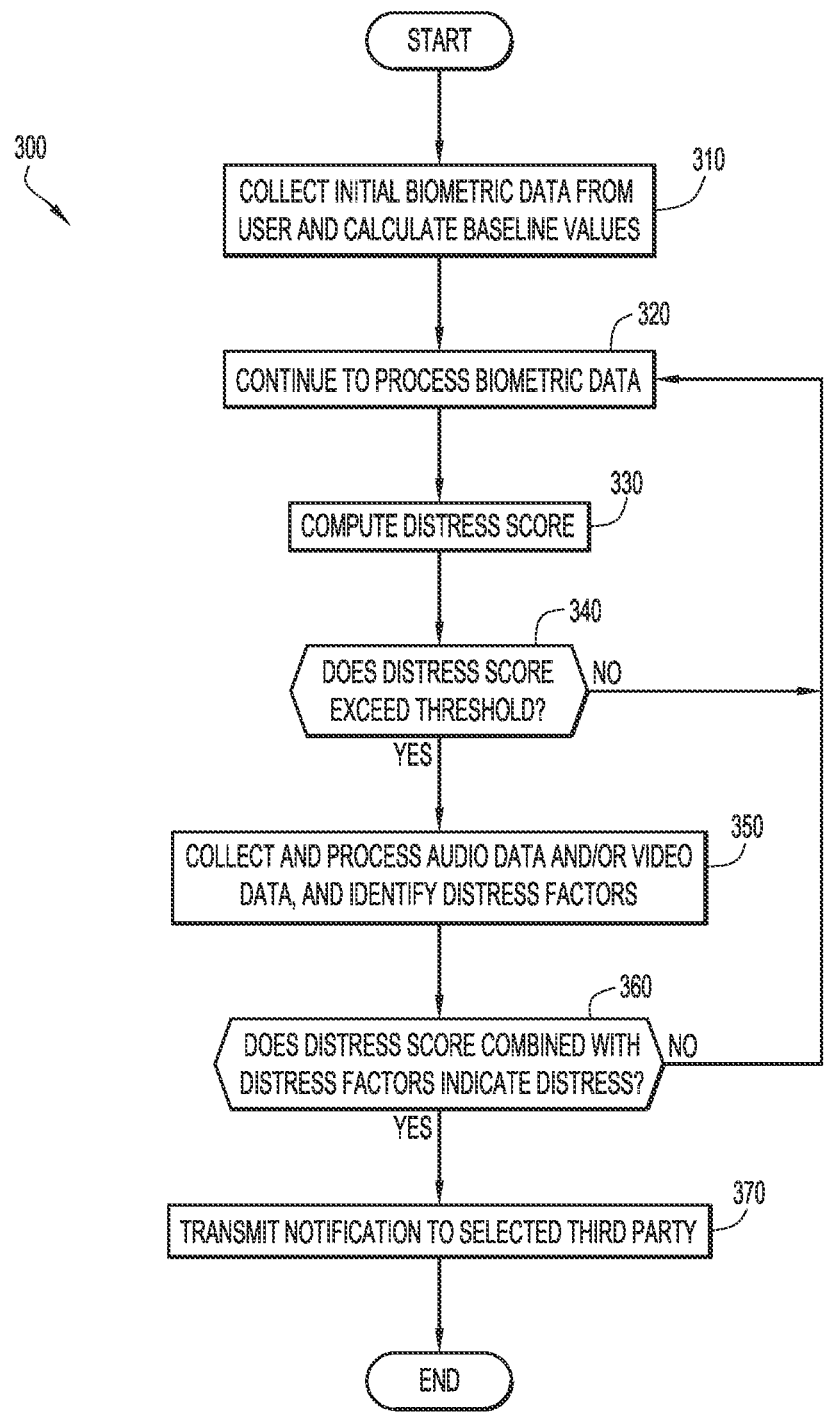
FIG. 3 is a flow chart depicting a method of processing biometric data to detect distress and deliver assistance in accordance with an embodiment of the present invention.

FIG. 3 is a flow chart depicting a method 300 of processing biometric data to detect distress and deliver assistance in accordance with an embodiment of the present invention.

Initial biometric data is collected from a user and the user's baseline values are calculated at operation 310. A user of client device 105 may capture biometric data via peripheral devices 125A-125N during a period in which the user is not experiencing any conditions or activities that would raise the user's baseline values. Captured biometric data can be transmitted to biometric processing module 140 of biometric monitoring server 130 in order to analyze the data to determine baseline values. Additionally or alternatively, biometric module 115 of client device 105 may determine some or all of the baseline values for a user.

In general, the user's initial biometric data may be obtained under conditions that do not substantially affect the biometrics being measured. For example, a user may provide a sample of biometric data when the user is not under stress, when the user is currently experiencing a resting heart rate, when the user is not overheated, when the user is well-rested, and the like. In some embodiments, a user indicates via client device 105 that the user's current physical and/or mental status is suitable for the collection of baseline biometric data. In other embodiments, the baseline biometric values for a user are determined over time using conventional or other statistical sampling and analysis techniques. Baseline biometric data values can be collected for any distress metric, including a blood pressure metric, a heart rate metric, a temperature metric, a perspiration metric, and/or a voice volume metric. Baseline biometric values may be stored by biometric monitoring server 130. In some embodiments, a user's baseline biometric values are re-computed after a span of time or at a user's request; for example, a user who has started a new cardiovascular exercise regimen may expected to observe a decrease in the user's resting heart rate over time, necessitating an update to the user's baseline values every few weeks.

Biometric data of the user is processed at operation 320. Biometric module 115 may continue to obtain biometric data collected by sensors 127 of peripheral devices 125A-125N, and to provide the obtained biometric data to biometric processing module 140 of biometric monitoring server 130 for additional processing. Biometric data may be obtained according to a particular schedule or based on particular conditions being satisfied. For example, biometric data may be collected from a user during the day, when the location of client device 105 indicates that the user is away from home, and the like. In various embodiments, some or all of a user's biometric data may be collected continuously or collected at particular time intervals (e.g., every five minutes, every twenty minutes, etc.).

A distress score is computed at operation 330. When biometric processing module 140 of biometric monitoring server 130 receives biometric data from the client, biometric processing module 140 may compare the user's biometric data to the user's baseline values to obtain a value for each distress metric that is being measured (e.g., a blood pressure metric, a heart rate metric, a temperature metric, a perspiration metric, and a voice volume metric). In general, a rules-based approach may be utilized in which the extent to which a particular biometric deviates from its corresponding baseline value is computed, and based on a predetermined rule, is assigned a particular value. For example, if a user's heart rate is 20% above the user's baseline, the user may be assigned a current heart rate metric of 0.7. Individual distress metrics may be collapsed into a single value to determine the distress score for a user. In various embodiments, a user's distress metrics may be averaged, summed, used to construct a vector whose magnitude is calculated, and the like. Other baselines that are collected may include a user's normal language and tone, which can be determined through phone calls or normal periods of conversation (e.g., when the user as at home). Additionally, common usage of a personal device, such as client device 105, can be determined to distinguish between active and inactive states; for example, gyroscopes and/or accelerometers can observe various orientations of the device and movement patterns to determine whether the user is walking, stationary, sitting, standing, lying down, etc.

Operation 340 determines whether the distress score exceeds a threshold. The overall distress score for a user can be compared to a predetermined threshold value to determine whether the user's distress score is indicative of actual distress. If the user's distress score exceeds the threshold, then method 300 proceeds to collect and process audio data and/or video data and to identify distress factors at operation 350. Otherwise, biometric processing module 140 continues to process a user's biometric data at operation 320 and to subsequently compute a distress score at operation 330.

Audio data and/or video data is collected and processed, and distress factors are identified at operation 350. In response to determining that a user's distress score exceeds a threshold, present invention embodiments may verify that the user is in distress by determining whether there are any distress factors present in the user's environment. The audio data and/or video data may be collected from one or more sources, including client device 105, peripheral devices 125A-125N, ad hoc network devices 165A-165N, and/or computing devices of other users who have opted into a system that implements present invention embodiments.

In some embodiments, audio data may be processed by sentiment analysis module 145 to determine a sentiment of the user and/or other individuals near the user. Language and tone analysis may be performed to identify any distress factors based on the presence or absence of particular spoken words or tones of a speaker, including the user or other speakers. For example, the user saying "help" or "stop" may be identified as a distress factor. The language and tone of a user may also be compared to established baseline language and/or tone to identify distress factors.

In some embodiments, video data may be processed by cognitive video analysis module 150 to identify distress factors based on the presence or absence of other individuals or objects in the user's vicinity, expressions of the user and/or other individuals. Particular observations may be defined as actions or events that are occurring or being performed. Particular observations may be defined as distress factors, such as the user or other individuals running, an individual performing threatening actions near the user, individuals following the user, the user making a frightened expression, and the like. In some embodiments, video data may be analyzed to classify the location of the user. For example, if the user is at a location associated with exercise, then the user may be determined to not be in distress despite the user's elevated heart rate causing the distress score to exceed its threshold. In contrast, if a user is at a location not normally associated with exercise, the user's distress score exceeding its threshold may be taken as indicative of distress.

Operation 360 determines whether the distress score combined with the distress factors indicates user distress. When a user's distress score exceeds the predetermined threshold, user assessment module 155 analyzes any identified distress factors to determine whether the user is in distress. In some embodiments, user assessment module 155 identifies distress when a predetermined number of distress factors are present, or when particular distress factors are present. For example, user assessment module 155 may identify a user in distress when there are three distress factors identified in the audio data and/or video data, or when a specific distress factor, such as the user shouting "help me," is identified. In some embodiments, specific factors that indicate a lack of distress may be used to make a determination that, despite the user's distress score exceeding a threshold, the user is not in distress. Identified distress factors may also be converted to numerical values based on a set of predefined rules. For example, distress factors can be rated by the degree to which each distress factor represents a risk to the user, and provided with numerical values accordingly. In such embodiments, user assessment module 155 may combine the values of the identified distress factors to compare the combined value to a threshold in order to determine whether the user is in distress. In a further environment, the combined values of the identified distress factors may also be combined with the distress score, and the resulting value can be compared to a threshold to identify whether the user is in distress.

If a user is determined to be in distress, a notification is transmitted to one or more selected third parties at operation 370. Otherwise, method 300 continues to process biometric data of the user at operation 320. A party may be selected to receive the notification based on the location of the user and/or type or severity of distress. For example, parties may be filtered out based on the geographical locations served by the parties and the geographical location of the user such that only parties who serve the user's current location may be notified. Parties may be selected based on the severity of distress or the type of distress, which can be determined using a rules-based approach that associates types of distress factors and/or values of distress scores with particular parties. For example, if a distress factor indicates that there is a medical emergency, a paramedic unit may be contacted, whereas if a distress factor indicates potentially unlawful behavior, a law enforcement unit may be notified. Multiple third parties may be notified, including different types of first responders. The notification may include a location and identify of the user, and may include descriptions of the distress factors, the user's distress score, and/or the user's raw biometric data. Thus, the notified third parties may make informed decisions in order to rapidly respond to the user in distress and to increase the likelihood of de-escalation of situations that cause user distress.

Figure 4:
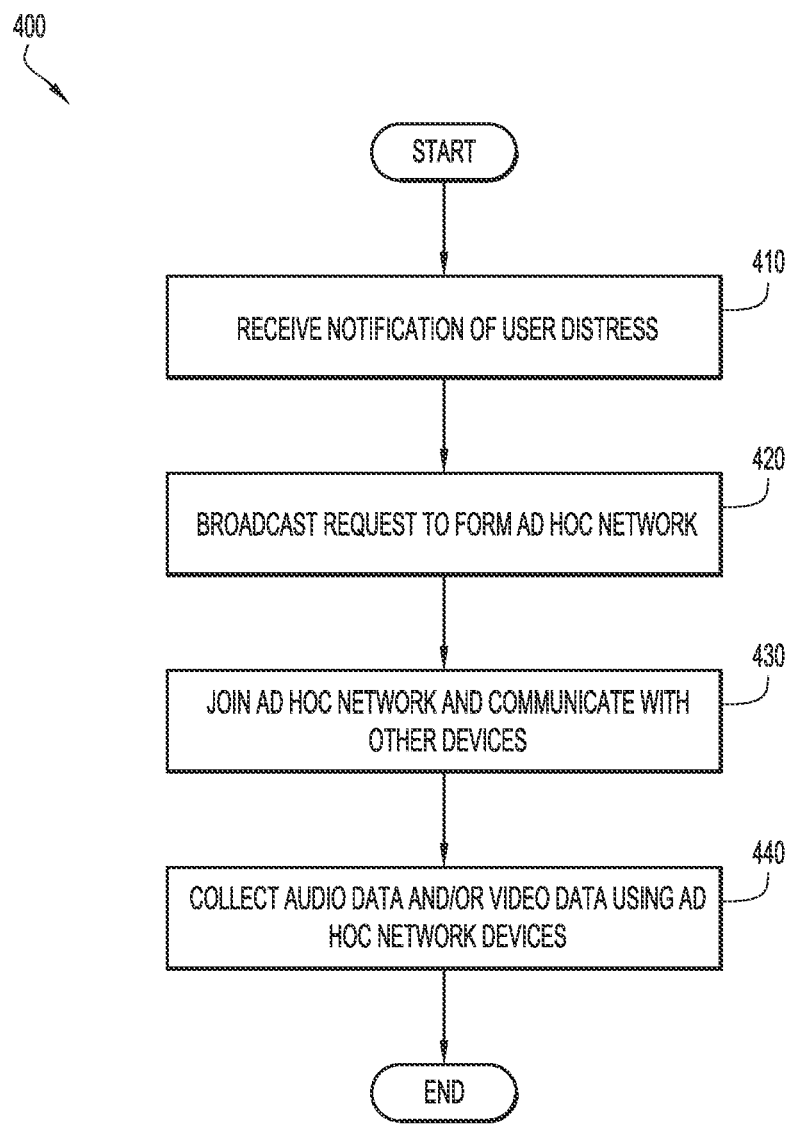
FIG. 4 is a flow chart depicting a method of user and environmental monitoring via an ad hoc network of devices in accordance with an embodiment of the present invention.

FIG. 4 is a flow chart depicting a method 400 of user and environmental monitoring via an ad hoc network of devices in accordance with an embodiment of the present invention.

A notification of user distress is received at operation 410. When biometric monitoring server 130 determines that a user is experiencing distress, a notification may be transmitted to client device 105. In response, ad hoc network module 120 of client device 105 may process the notification to initiate formation of an ad hoc network.

A request is broadcast to form an ad hoc network at operation 420. In response to receiving the notification, ad hoc network module 120 may broadcast, to any compatible devices in the vicinity of the user, instructions to form an ad hoc network. The broadcast may be transmitted wirelessly, and any devices, such as ad hoc network devices 165A-165N, that are within range and compatible may receive and process the instructions to form the ad hoc network. In some embodiments, the broadcast and/or subsequently communications in the ad hoc network utilize a machine-to-machine communication protocol, such as a Bluetooth® Open Platform Communications (OPC) Unified Architecture (UA) protocol.

Computing devices join the ad hoc network and communicate with each other at operation 430. Ad hoc network devices 165A-165N may include any devices that received the instructions to join the ad hoc network. In some embodiments, the network is a mesh network in which some participating devices transmit data via other devices to provide desired coverage over an area surrounding the user. In some embodiments, one or more of the ad hoc network devices 165A-165N that initially received the broadcast of instructions to form the ad hoc network may themselves broadcast another set of instructions to be received by in-range devices may not directly be in range of the user's client device 105. In some embodiments, devices that can join an ad hoc network are assigned a location identifier (e.g., an address or geo-coordinates), and those devices may join the ad hoc network based on their proximity to client device 105. Ad hoc network devices 165A-165N may periodically perform checks on each other to ensure that other devices are properly capturing and/or transmitting data.

Audio data and/or video data is collected using the devices participating in the ad hoc network at operation 440. Each device, including client device 105 and ad hoc network devices 165A-165N, may capture audio data, video data, or both, and either save the data for later transmission or transmit the data to one or more destinations, such as biometric monitoring server 130. Thus, details of a user's environment may be captured for current or subsequent analysis. In some embodiments, the data is encrypted prior to transmission, and any sensitive personal information may be removed from the data. In some embodiments, devices that participate in the collection of audio data and/or video data may belong to other users who have consented to the use of their devices under particular conditions, such as that the data's usage is limited to the dispatch of assistance, and/or that the data is deleted within a particular time period (e.g., within three days). Collected data may be accompanied by metadata including timestamps, locations identifiers (e.g., addresses or geo-coordinates), and the like. In some embodiments, audio and/or video data is collected from ad hoc network devices 165A-165N that are within a threshold distance of client device 105 (e.g., based on geo-coordinate data). In some embodiments, ad hoc network devices 165A-165N that collect video and/or audio data may update according to the user's location; for example, as a user comes within a threshold distance of devices, those devices may begin to collect data, and as a user moves a threshold distance away from devices, those devices may cease data collection. Similarly, devices may selectively collect data based on particular viewing angles; if a user does not fall within a viewing angle of a device, the device may not collect and/or transmit video data.

Figure 5:
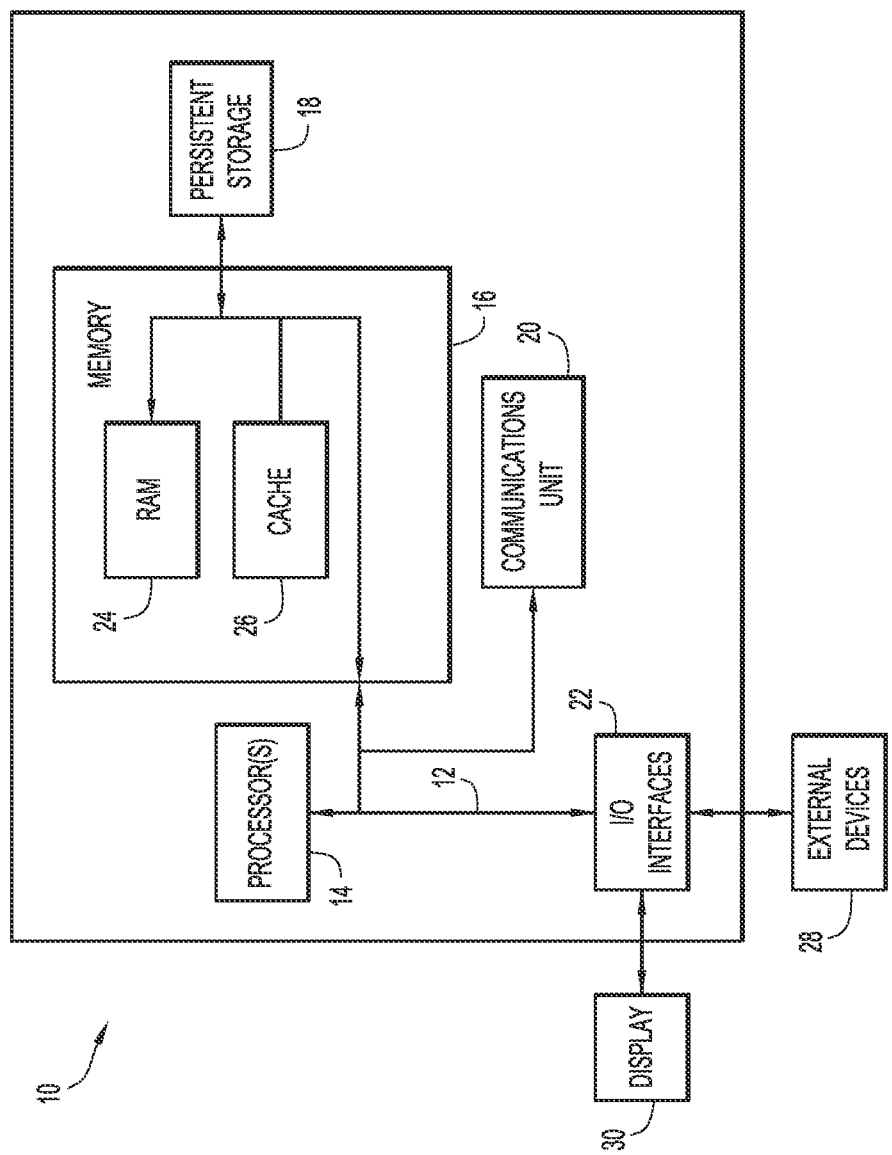
FIG. 5 is a block diagram depicting a computing device in accordance with an embodiment of the present invention.

FIG. 5 is a block diagram depicting components of a computer 10 suitable for executing the methods disclosed herein. Computer 10 may implement client device 105, peripheral devices 125A-125N, biometric monitoring server 130, and/or ad hoc network devices 165A-165N in accordance with embodiments of the present invention. It should be appreciated that FIG. 5 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to biometric-based distress detection and assistance (e.g., biometric data, baseline data, audio data, video data, sentiment analysis model data, cognitive video analysis model data, data relating to parties who provide assistance, any corresponding metadata, etc.) may be stored within any conventional or other data structures (e.g., files, arrays, lists, stacks, queues, records, etc.) and may be stored in any desired storage unit (e.g., database, data or other repositories, queue, etc.). The data transmitted between client device 105, peripheral devices 125A-125N, biometric monitoring server 130, and/or ad hoc network devices 165A-165N may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to biometric-based distress detection and assistance (e.g., biometric data, baseline data, audio data, video data, sentiment analysis model data, cognitive video analysis model data, data relating to parties who provide assistance, any corresponding metadata, etc.) may include any information provided to, or generated by, client device 105, peripheral devices 125A-125N, biometric monitoring server 130, and/or ad hoc network devices 165A-165N. Data relating to biometric-based distress detection and assistance may include any desired format and arrangement, and may include any quantity of any types of fields of any size to store any desired data. The data relating to biometric-based distress detection and assistance may include any data collected about entities by any collection mechanism, any combination of collected information, and any information derived from analyzing collected information.

The present invention embodiments may employ any number of any type of user interface (e.g., Graphical User Interface (GUI), command-line, prompt, etc.) for obtaining or providing information (e.g., data relating to biometric-based distress detection and assistance), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of improving the detection of users in distress and subsequent providing of assistance.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., communications software, server software, biometric module 115, ad hoc network module 120, biometric processing module 140, sentiment analysis module 145, cognitive video analysis module 150, user assessment module 155, ad hoc network module 185, etc.). These systems may include any types of monitors and input devices (e.g., keyboard, mouse, voice recognition, etc.) to enter and/or view information.

It is to be understood that the software (e.g., communications software, server software, biometric module 115, ad hoc network module 120, biometric processing module 140, sentiment analysis module 145, cognitive video analysis module 150, user assessment module 155, ad hoc network module 185, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., communications software, server software, biometric module 115, ad hoc network module 120, biometric processing module 140, sentiment analysis module 145, cognitive video analysis module 150, user assessment module 155, ad hoc network module 185, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to biometric-based distress detection and assistance). The database system may be implemented by any number of any conventional or other databases, data stores or storage structures (e.g., files, databases, data structures, data or other repositories, etc.) to store information (e.g., data relating to biometric-based distress detection and assistance). The database system may be included within or coupled to the server and/or client systems. The database systems and/or storage structures may be remote from or local to the computer or other processing systems, and may store any desired data (e.g., data relating to biometric-based distress detection and assistance).

The present invention embodiments may employ any number of any type of user interface (e.g., Graphical User Interface (GUI), command-line, prompt, etc.) for obtaining or providing information (e.g., data relating to biometric-based distress detection and assistance), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for any number of applications in the relevant fields, including, but not limited to, analyzing biometric data in various contexts to identify users in distress.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for biometric-based distress detection and assistance, the method comprising:
   receiving biometric information associated with an entity and audio data associated with an environment of the entity;
   calculating a distress score based on the biometric information;
   analyzing the audio data to identify one or more distress factors, wherein the one or more distress factors are identified by analyzing the audio data using a machine learning model that is trained to identify the one or more distress factors based on a content of speech and a manner of speech;
   in response to determining that the distress score exceeds a distress threshold and in response to identifying the one or more distress factors, transmitting a notification that the entity requires aid to a third party; and
   in response to determining that the distress score exceeds the distress threshold:
      forming a communication network among a plurality of ad hoc computing devices;
      identifying one or more of the ad hoc computing devices in proximity to the entity, wherein identifying the one or more of the ad hoc computing devices comprises transmitting a first set of instructions from a client device of the entity to a first one or more ad hoc computing devices, and transmitting a second set of instructions from the first one or more ad hoc computing devices to a second one or more ad hoc computing devices; and
      collecting video data and additional audio data that are associated with the environment of the entity from the one or more identified ad hoc computing devices, wherein the first one or more ad hoc computing devices collect the video data and additional audio data when the entity is within a threshold distance of the first one or more ad hoc computing devices, and wherein the second one or more ad hoc computing devices collect the video data and additional audio data when the entity is within the threshold distance of the second one or more ad hoc computing devices, and wherein the video data is analyzed to further identify that the one or more distress factors include one or more of: one or more individuals coming within a threshold distance of the entity, and raising of hands of the entity.

2. The computer-implemented method of claim 1, wherein the distress score is based on values for one or more distress metrics obtained by comparing the biometric information against baseline biometric values for the entity, and wherein the one or more distress metrics include a blood pressure metric, a heart rate metric, a temperature metric, a perspiration metric, and a voice volume metric.

3. The computer-implemented method of claim 1, wherein the one or more distress factors are identified by analyzing the video data using a cognitive video analysis model, and wherein the cognitive video analysis model identifies one or more of: objects present in the video data, and a physical activity performed by one or more individuals in the video data.

4. The computer-implemented method of claim 1, wherein the notification further indicates a level of severity based on the distress score and the one or more distress factors.

5. A computer system for biometric-based distress detection and assistance, the computer system comprising:
one or more computer processors;
one or more computer readable storage media;
program instructions stored on the one or more computer readable storage media for execution by at least one of the one or more computer processors, the program instructions comprising instructions to:
receive biometric information associated with an entity and audio data associated with an environment of the entity;
calculate a distress score based on the biometric information;
analyze the audio data to identify one or more distress factors, wherein the one or more distress factors are identified by analyzing the audio data using a machine learning model that is trained to identify the one or more distress factors based on a content of speech and a manner of speech; and
in response to determining that the distress score exceeds a distress threshold and in response to identifying the one or more distress factors, transmit a notification that the entity requires aid to a third party; and
in response to determining that the distress score exceeds the distress threshold:
form a communication network among a plurality of ad hoc computing devices;
identify one or more of the ad hoc computing devices in proximity to the entity, wherein identifying the one or more of the ad hoc computing devices comprises transmitting a first set of instructions from a client device of the entity to a first one or more ad hoc computing devices, and transmitting a second set of instructions from the first one or more ad hoc computing devices to a second one or more ad hoc computing devices; and
collect video data and additional audio data that are associated with the environment of the entity from the one or more identified ad hoc computing devices, wherein the first one or more ad hoc computing devices collect the video data and additional audio data when the entity is within a threshold distance of the first one or more ad hoc computing devices, and wherein the second one or more ad hoc computing devices collect the video data and additional audio data when the entity is within the threshold distance of the second one or more ad hoc computing devices, and wherein the video data is analyzed to further identify that the one or more distress factors include one or more of: one or more individuals coming within a threshold distance of the entity, and raising of hands of the entity.

6. The computer system of claim 5, wherein the distress score is based on values for one or more distress metrics obtained by comparing the biometric information against baseline biometric values for the entity, and wherein the one or more distress metrics include a blood pressure metric, a heart rate metric, a temperature metric, a perspiration metric, and a voice volume metric.

7. The computer system of claim 5, wherein the one or more distress factors are identified by analyzing the video data using a cognitive video analysis model, and wherein the cognitive video analysis model identifies one or more of: objects present in the video data, and a physical activity performed by one or more individuals in the video data.

8. The computer system of claim 5, wherein the notification further indicates a level of severity based on the distress score and the one or more distress factors.

9. A computer program product for biometric-based distress detection and assistance, the computer program product comprising one or more computer readable storage media collectively having program instructions embodied therewith, the program instructions executable by a computer to cause the computer to:
receive biometric information associated with an entity and audio data associated with an environment of the entity;
calculate a distress score based on the biometric information;
analyze the audio data to identify one or more distress factors, wherein the one or more distress factors are identified by analyzing the audio data using a machine learning model that is trained to identify the one or more distress factors based on a content of speech and a manner of speech; and
in response to determining that the distress score exceeds a distress threshold and in response to identifying the one or more distress factors, transmit a notification that the entity requires aid to a third party; and
in response to determining that the distress score exceeds the distress threshold:
form a communication network among a plurality of ad hoc computing devices;
identify one or more of the ad hoc computing devices in proximity to the entity, wherein identifying the one or more of the ad hoc computing devices comprises transmitting a first set of instructions from a client device of the entity to a first one or more ad hoc computing devices, and transmitting a second set of instructions from the first one or more ad hoc computing devices to a second one or more ad hoc computing devices; and
collect video data and additional audio data that are associated with the environment of the entity from the one or more identified ad hoc computing devices, wherein the first one or more ad hoc computing devices collect the video data and additional audio data when the entity is within a threshold distance of the first one or more ad hoc computing devices, and wherein the second one or more ad hoc computing devices collect the video data and additional audio data when the entity is within the threshold distance of the second one or more ad hoc computing devices, and wherein the video data is analyzed to further identify that the one or more distress factors include one or more of: one or more individuals coming within a threshold distance of the entity, and raising of hands of the entity.

10. The computer program product of claim 9, wherein the distress score is based on values for one or more distress metrics obtained by comparing the biometric information against baseline biometric values for the entity, and wherein the one or more distress metrics include a blood pressure metric, a heart rate metric, a temperature metric, a perspiration metric, and a voice volume metric.

11. The computer program product of claim 9, wherein the one or more distress factors are identified by analyzing the video data using a cognitive video analysis model, and wherein the cognitive video analysis model identifies one or more of: objects present in the video data, and a physical activity performed by one or more individuals in the video data.

* * * * *